United States Patent [19]
Klee et al.

[11] Patent Number: 4,999,181
[45] Date of Patent: Mar. 12, 1991

[54] METHOD OF MANUFACTURING TITANIUM DIOXIDE POWDER

[75] Inventors: Mareike K. Klee, Hückelhoven/Brachelen; Hans-Wolfgang Brand, Aachen, both of Fed. Rep. of Germany

[73] Assignee: U.S. Philips Corporation, New York, N.Y.

[21] Appl. No.: 504,731

[22] Filed: Apr. 2, 1990

Related U.S. Application Data

[63] Continuation of Ser. No. 271,140, Nov. 14, 1988, abandoned.

[30] Foreign Application Priority Data

Nov. 25, 1987 [DE] Fed. Rep. of Germany ....... 3739854

[51] Int. Cl.$^5$ .............................................. C04B 35/00
[52] U.S. Cl. .................................... 423/608; 423/609; 423/610
[58] Field of Search .............. 423/610, 611, 612, 613, 423/614; 501/134; 502/8

[56] References Cited

U.S. PATENT DOCUMENTS

| | | | |
|---|---|---|---|
| 4,012,338 | 3/1977 | Urwin | 423/610 |
| 4,166,147 | 8/1979 | Lange et al. | 423/610 |
| 4,268,422 | 5/1981 | Becker et al. | 423/610 |
| 4,286,378 | 9/1981 | Micheli | 423/610 |
| 4,543,341 | 9/1985 | Barringer et al. | 423/608 |
| 4,732,750 | 3/1988 | Olson et al. | 423/610 |

FOREIGN PATENT DOCUMENTS

| | | | |
|---|---|---|---|
| 56-50117 | 5/1981 | Japan | 423/610 |
| 62-220814 | 10/1987 | Japan | 423/610 |
| 479733 | 12/1975 | U.S.S.R. | 423/610 |

OTHER PUBLICATIONS

Chemical Abstract 77830, vol. 66, 1967.

*Primary Examiner*—Peter D. Rosenberg
*Attorney, Agent, or Firm*—Norman N. Spain

[57] ABSTRACT

A method of manufacturing titanium dioxide powder by hydrolysis of a titanium alcoholate, in which the titanium alcoholate is made to react with a 10M acetic acid aqueous solution and an aqueous ethanol solution under an $N_2$ atmosphere, the precipitate consisting of titanium dioxide is separated from the liquid phase after a reaction time of 24 hours, the precipitate is rinsed with deionized water and subsequently with an aqueous ammoniacal solution having a pH value of 9, and the phases are separated.

3 Claims, No Drawings

METHOD OF MANUFACTURING TITANIUM DIOXIDE POWDER

This is a continuation of application Ser. No. 271,140, filed Nov. 14, 1988, now abandoned.

The invention relates to a method of manufacturing titanium dioxide powder by means of hydrolysis of a titanium alcoholate.

Titanium dioxide powders are an important starting material for the manufacture of widely differing electronic components such as, for example, multilayer capacitors or nonlinear resistors having a positive temperature characteristic. The ever existing demand for higher quality electronic components as well as an improved process control in the manufacture of these components imposes higher requirements on the starting materials. The microstructure of ceramic bodies formed in the sintering process is largely determined by the powder characteristics of the starting materials used (particle size, particle size distribution, particle shape, stoichiometry, phase composition). In particular, powder particles having a defined particle size, a round shape and a narrow-range particle size distribution are in demand. Further, the starting materials must be of a high purity. Moreover, if large-scale manufacturing is to be economical, the methods used for manufacturing the starting materials must involve low costs and must be little time consuming as regards the preparation.

Titanium dioxide powders are manufactured by means of different methods which, however, do not lead to optimum results as regards the reproducible adjustment of a desired particle size and particle size distribution of the powders obtained, nor as regards their efficiency.

Large scale production of titanium dioxide takes place by decomposition of ores using sulphuric acid or hydrochloric acid. Titanium is hydrolytically precipitated as titanium dioxide from the titanium sulphate solutions produced. During decomposition using hydrochloric acid titanium tetrachloride is obtained which is either hydrolysed in an aqueous solution or converted in the vapour state into titanium dioxide using oxidizing gases. Dependent on the manufacturing process the titanium dioxide powders thus produced exhibit a high degree of impurities due to the presence of foreign ions such as, for example, Fe, Al, Si, Cl. In the sulphuric acid process very coarse-grained, highly aggregated powder particles haivng an irregular particle shape are obtained. In order to obtain powder particles having a particle size from approximately 1 to 2 $\mu$m grinding processes are necessary which introduce impurities into the powder. In the hydrochloric acid process fine titanium dioxide powder particles are obtained which, however, are also highly aggregated.

Methods of manufacturing non-aggregated titanium dioxide particles having a round particle shape are known, but for certain applications their particle size is too small. For example, it is known from Comm.Am.-Cer.Soc. 1982, December, pp. C 199 to C 201 to produce titanium dioxide particles having a round particle shape and a high purity by means of hydrolysis of titanium alcoholates using deionized water. Further, it is known from J. Coll. and Interf. Sc. 95 (1983), pp. 128 to 239, to produce titanium dioxide particles having a round particle shape by means of hydrolysis of titanium alcoholate aerosols using water vapour. However, both known methods only permit the manufacture of powder particles having a particle diameter in the range from 0.1 to 0.7 $\mu$m.

It is known from J. Coll. and Interf. Sc. 61 (1977), pp. 302 to 311 to produce titanium dioxide powder having a round particle shape by means of hydrolysis of titanium tetrachloride in hydrochloric acid at reaction temperatures above ambient (98° C.) in the presence of $SO_4^{2-}$-anions. Dependent upon the reaction time (22 to 47 days) and the reaction concentrations, the particle size varies from 0.8 to 4 $\mu$m. Due to the long reaction times of this batch process, large-scale production is very costly. Moreover, it is to be expected that hydrolysis of titanium tetrachloride in hydrocloric acid in the presence of $SO_4^{2-}$-anions leads to titanium dioxide powder which is contaminated with inorganic ions.

It is an object of the invention to improve a method of the type mentioned in the opening paragraph such that monodisperse highly pure titanium dioxide particles having a round particle shape and a desired grain size greater than 0.7 $\mu$m can be manufactured economically in a process of relatively short duration.

This object is achieved in accordance with the invention in that (a) subsequently a 10M acetic acid aqueous solution and an aqueous ethanol solution in an $N_2$ atmosphere are added to the titanium alcoholate and are made to react with it, (b) the precipitate consisting of titanium dioxide particles is separated from the liquid phase aftera reaction time of 24 hours, (c) the precipitate is rinsed with deionized water and subsequently with an aqueous ammoniacal solution having a pH value of 9 and (d) the solid an the liquid phases are separated.

In accordance with an advantageous further embodiment of the method in accordance with the invention, titanium dioxide, formed by postprecipitation from the liquid phase obtained in accordance with process step (b), is separated from the liquid phase and subsequently treated in accordance with the process steps (c) and (d), within a period of 3 days.

Advantageously, titanium-tetra-ethoxide which is dissolved in ethanol is used as titanium alcoholate.

The following advantages in particular are obtained by means of the method in accordance with the present invention: Owing to the use of titanium alcoholates, organic solvents, an organic acid and deionized water, highly pure powders, i.e. powders which are not contaminated by inorganic cations or anions, are obtained. Owing to the use of organic acids nucleation and growth of the particles can be controlled during hydrolysis of titanium alcoholates, in such a manner that titanium dioxide particles having a round particle shape and a particle diameter in the range from 0.7 to 2.6 $\mu$m are formed. The particles thus obtained can be divided in fractions having different particle diameters by means of conventional separation methods such as, for example, filtration, centrifugation, sedimentation. A particular advantage of the present method is that titanium dioxide particles having a round particle shape and a diameter in the range from 1.5 to 2.2 $\mu$m are obtained after a reaction time of only one day. A further advantage of the present method is that by postprecipitation after a reaction time of 3 days titanium dioxide particles having a round particle shape and a diameter in the range from 0.7 to 2.6 $\mu$m can be manufactured. The particles formed by postprecipitation can also be divided in fractions having different diameters.

The invention will now be explained in more detail by means of an example.

2.07 ml of titanium-tetra-ethoxide are dissolved in 48 ml of ethanol (denatured) in an inert gas atmosphere. The absolute alcohol to be used is dried by means of magnesium chips and subsequently distilled. 0.1 ml of a 10M acetic acid aqueous solution is pipetted to the 0.2M titanium-tetra-ethoxide/ethanol solution, whilst stirring vigorously. An aqueous ethanol solution is manufactured, to which end 0.54 g of deionized water is dissolved in 49.46 ml of absolute ethanol; this solution is mixed with the titanium alcoholate solution, the addition of the aqueous ethanol solution being carried out by means of a dropping funnel within 10 s in an $N_2$ atmosphere and whilst stirring vigorously. A magnetic stirrer can advantageously be used. After both solutions have been intensively mixed for 10 s the stirring apparatus is switched off. The precipitate of titanium dioxide particles which is formed in the solution over a period of 24 hours is filtered off using a cellulose acetate filter having a pore size if 0.2 $\mu$m. To obtain complete hydrolysis of titanium alcoholate groups on the powder surface the precipitate is dispersed in 50 ml of deionized water for 10 min. and is subsequently centrifuged off; this rinsing process is repeated three times. Subsequently, the titanium dioxide powder obtained is dispersed in an ammoniacal aqueous solution having a pH value of 9.

Images obtained by means of a scanning microscope reveal that round particles having a particle size in the range from 1.5 to 2.2 $\mu$m are obtained.

By means of diffraction radiography it was found that the powder is X-ray amorphous.

A postprecipitation of titanium dioxide particles takes place in the filtration from which the titanium dioxide precipitate formed was removed by filtration. The precipitate is filtered off after three days using a cellulose acetate filter having a pore size of 0.2 $\mu$m, and, as described above, is rinsed four times with deionized water and subsequently dispersed in an ammoniacal aqueous solution having a pH value of 9. The separation of the liquid phase from the solid phase can be carried out by means of a centrifuging process. Images obtained by means of a scdanning microscope showed that through this postprecipitation titanium dioxide particles having a particle size in the range from 0.7 to 2.6 $\mu$m are obtained.

What is claimed is:

1. A method of manufacturing amorphous titanium dioxide powder, said method comprising:
    (a) adding, under an $N_2$ atmosphere, a 10M aqueous solution of acetic acid and an aqueous solution of ethanol to a solution of a titanium alcoholate to form a mixture of said solutions and to thereby hydrolize said titanium alcoholate,
    (b) continuing said hydrolysis by allowing said mixture of said solutions to remain under the $N_2$ atmosphere for at the last 24 hours thereby froming a precipitate consisting of titanium dioxide particles and a liquid phase,
    (c) separating said precipitate from said liquid phase,
    (d) washing said separated precipitate first with deionized water and then with an aqueous ammoniacal solution having a pH of 9 and
    (e) separating said precipitate from said aqueous ammoniacal solution.

2. The method of claim 1 wherein additional titanium dioxide formed, which precipitates out of the liquid phase obtained in accordance with step b is separated from said liquid phase and subsequently treated in accordance with steps d and c within a period of three days.

3. A method of claim 1 wherein the titanium alcoholate is titanium tetraethoxide dissolved in ethanol.

* * * * *